US008990309B1

(12) United States Patent
Brown

(10) Patent No.: US 8,990,309 B1
(45) Date of Patent: *Mar. 24, 2015

(54) USER-CALIBRATION ACTIVITY NEWSFEED ON A SOCIAL NETWORK

(71) Applicant: Invent.ly, LLC, Woodside, CA (US)

(72) Inventor: Stephen J. Brown, Woodside, CA (US)

(73) Assignee: Invent.ly, LLC, Woodside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,659

(22) Filed: Aug. 15, 2013

Related U.S. Application Data

(63) Continuation of application No. 11/999,249, filed on Dec. 3, 2007, now Pat. No. 8,533,269.

(51) Int. Cl.
*G06F 15/16* (2006.01)
*H04L 12/26* (2006.01)
*H04L 12/58* (2006.01)
*G06F 1/24* (2006.01)
*G06F 9/00* (2006.01)

(52) U.S. Cl.
CPC ............... *H04L 43/04* (2013.01); *H04L 51/16* (2013.01)
USPC ........................................................ 709/205

(58) Field of Classification Search
USPC .................................... 709/205, 224; 713/100
See application file for complete search history.

(56) References Cited

U.S. PATENT DOCUMENTS

2007/0174389 A1* 7/2007 Armstrong et al. ........... 709/204
2008/0126318 A1* 5/2008 Frankovitz ........................ 707/3
2009/0144639 A1* 6/2009 Nims et al. ..................... 715/757

* cited by examiner

*Primary Examiner* — Evans Desrosiers
(74) *Attorney, Agent, or Firm* — Christopher P. Maiorana, PC

(57) ABSTRACT

Calibration and publication of user activity on a computer implemented social network is provided. Activity signals of user activity is measured by an activity monitor and calibrated by the user. The calibration includes assigning an activity signal with a personalized identifier for the activity for comparison with future measured activity signals. Near real-time publication of the activity on the social network allow users of the network to timely view user behavior. The publication on a social networking website includes the identifier if the activity has been calibrated. By calibrating and publishing user activity, users can connect to others based on the activity. The publication can be on newsfeed on a user profile for friends of the user to view. A user and the user's friends can communicate with each other, which allows the user to receive motivation from the friends and be accountable to the friends.

17 Claims, 5 Drawing Sheets

USER-CALIBRATION ACTIVITY NEWSFEED ON A SOCIAL NETWORK

This application relates to U.S. Ser. No. 11/999,249, filed Dec. 3, 2007, which is incorporated by reference in its entirety.

FIELD OF THE INVENTION

The invention relates generally to activity monitoring. More particularly, the present invention relates to publishing user-calibrated activity on a social network.

BACKGROUND

Making lasting changes to personal behavior, such as weight loss or increasing fitness, can be a daunting task. Traditional methods for weight loss and fitness, including expert advice, diet regimens, books, and videos, are often ineffective due to their lack of emphasis on motivation and accountability. Internet-based weight loss and fitness programs are currently available, though they often suffer from the same deficiencies as the more traditional methods.

Social networking websites, such as Facebook.com, MySpace.com, and Twitter.com, provide members of the websites with access to an online community. Typically, a member of a social networking website is able to post and update member information, display pictures, join common interest groups, and send and receive messages from other members of the website. Twitter.com allows a member to update the member's information by sending a text message from the member's mobile phone. From this function, a member of Twitter.com is able to conveniently post the member's behavior in approximately real-time. However, the posting of member information is not automated, therefore accurate updates of member information require frequent and numerous text-based entries.

Activity-monitoring devices exist to make measurements of the activities of the users of the devices. A user of an activity-monitoring device can store the measurements in a computer for later viewing. However, the raw activity measurements can be difficult to interpret and identify because of the wide variety of potential activities. The activity measurements also generally do not give personalized or customized information, such customization is necessary due to the wide variation among different users undertaking similar activities.

The present invention addresses the difficult problem of affecting personal behavior and accurately and timely publishing the activity of a person. The present invention advances the art with a user-calibrated activity newsfeed on a social network capable of connecting people based on the activities.

SUMMARY OF THE INVENTION

The present invention is directed to calibrating activity measured by an activity monitor and publishing the activity to a computer implemented social network. An activity monitor is operated by a user of the social network and measures an activity signal due to the activity of the user. The measured activity can be identified by earlier user-calibrated activities and published on the social network website to friends of the user. The publication can be done essentially concurrently with the actual activity of the user. The calibration by the users themselves enables measured activities to be identified despite the wide variation of activities and users. The near real-time publication of activity to a social network of the present invention permits friends of the user to receive accurate and up-to-date behavioral information about the user. Furthermore, the user-calibrated and published activities allow users of the social network to connect to each other around user activities. These features are particularly useful for a social network for affecting personal behavior.

In the present invention, the activity signal is stored and compared with previously calibrated activities. If the activity signal is identified with one of the previously calibrated activities, the identifier is published on the social networking website. The publication can be on a newsfeed on a user profile of the user. If the activity signal does not correspond with any of the previously calibrated activities, the user can calibrate the activity by assigning an identifier to the activity. Calibration can occur while the activity is undertaken or any time afterward. Furthermore, user-calibration can be accomplished on the activity monitor or on a separate computing means.

The activity monitor can be a portable device capable of transmitting activity signals or other data wirelessly to the application server operating the computer implemented social network. The activity monitor can be an accelerometer, a pedometer, a GPS navigational device, a mobile phone, a personal digital assistant, or any other device capable of measuring motion of the user and/or distances traveled by the user. The activity monitor device can also be a medical device, such as a heart monitor or a glucose monitor, capable of measuring signals due to changes internal to the body of the user. The nature of the activity signal would depend on the type of activity monitor and the present invention functions irrespective of the type of activity monitor.

The present invention is particularly beneficial for users of a social network for behavioral change, such as weight loss or fitness. In addition to calibration and publication, the present invention enables users of the social network to connect to each other around the activities by communicating with each other. A user can transmit and receive messages to other users of the social network directly on the activity monitor or through other computing means. The connections and messages can be for motivational, encouragement, and accountability purposes.

BRIEF DESCRIPTION OF THE FIGURES

The present invention together with its objectives and advantages will be understood by reading the following description in conjunction with the drawings, in which.

DETAILED DESCRIPTION OF THE INVENTION

By providing friendship, support and accountability, a social network is a powerful tool that can help a user of the social network manage his or her personal behavior. To accomplish this, user activity must be accurately monitored, calibrated, and published for other users of the social network to view, which may foster connections between users based on the user activity. Below is a detailed description of a user-calibrated activity newsfeed on a social network.

Figure 1:
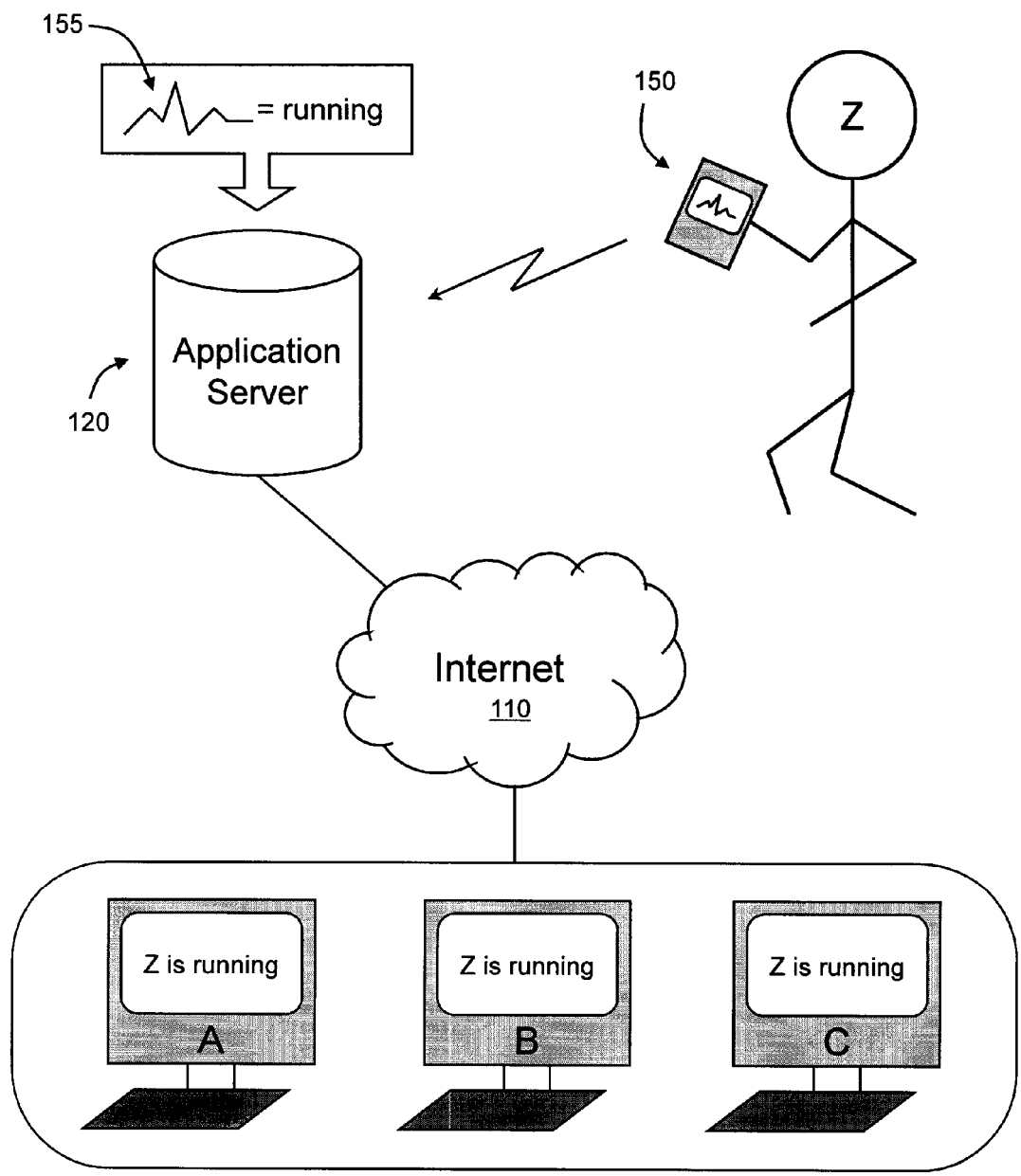
FIG. 1 shows an example of a system for monitoring and publishing user-calibrated activity on a social network according to the present invention.

FIG. 1 shows an example of a user Z whose activity is monitored by an activity monitor 150 and published on a computer implemented social network. The activity monitor measures an activity signal 155 based on the activity of user Z. The activity signal 155 is identified based on the user's calibration of the activity. The identified activity is published to friends A, B and C of user Z, where user Z and friends A, B and C are part of the computer implemented social network.

In a preferred embodiment, the social network is for affecting personal behavior, such as for fitness and weight loss. For example, user Z is a registered user of the social network who is trying to lose weight by physical exercise and dieting. Friends A, B and C of user Z view the activity of user Z and can send messages to user Z. By having friends watch the user's activity, the social network helps build accountability to help the user accomplish his or her behavioral change goals. The messages sent by the friends are useful for encouragement and motivation. Friends A, B and C can be registered with the computer implemented social network. However, one or more friends of registered user Z need not be registered, associated, or affiliated with the social network.

An application server 120 operates the social network. Functions of the application server 120 include storing user information, maintaining a list of friends for each user, and providing a means for users to communicate with each other. In a preferred embodiment, the application server 120 also maintains a user profile for each of the registered users of the social network. Members of the social network access the social network via a computer network, such as the Internet 110. The members of the social network access the network through any computing means capable of communicating with the network. The computing means include personal computers, laptops, mobile phones, and personal digital assistants. In a preferred embodiment, the interface with the social network is through a web browser.

The activity signal 155 measured by the activity monitor 150 is transmitted to the application server 120 to be published on the social network. In a preferred embodiment, the transmission of the activity signal 155 is through a wireless connection. The activity monitor 150 transmits the activity signal to the application server 120 via a wireless gateway, such as a short message system (SMS) gateway. The wireless transmission allows the activity to be published in near real-time, regardless of where the activity is undertaken. Alternatively, the activity monitor 150 can transmit the activity signal 155 through a wired connection with another computing means communicatively connected to the application server 120.

The activity monitor 150 can be any device capable of measuring a property of the user of the device. In a preferred embodiment, the activity monitor 150 is an accelerometer for measuring the motion of the user. The acceleration measurements of the accelerometer depend on the activity undertaken by the user. The activity monitor 150 can be any portable, wearable, or handheld device. The monitor can be a pedometer or a global positioning system (GPS) device for measuring locations and distances traveled. Medical devices, such as a heart monitor, a glucose monitor, or a diabetes monitor, can also be used to monitor the user's activity based on signals derived from changes internal to the user's body. The activity monitor 150 can be incorporated into a portable computing device such as a mobile phone or a personal digital assistant. For example, an accelerometer built into a mobile phone measures a user's motion, then the measurements are transmitted through a cell phone network to the application server 120 for publishing the activity. The nature of the activity signal 155 depends on the activity monitor 150. The signal 155 can be a simple numerical value or a location. However, the activity signal 155 may also be a more complicated pattern measured by the activity monitor.

Figure 2:
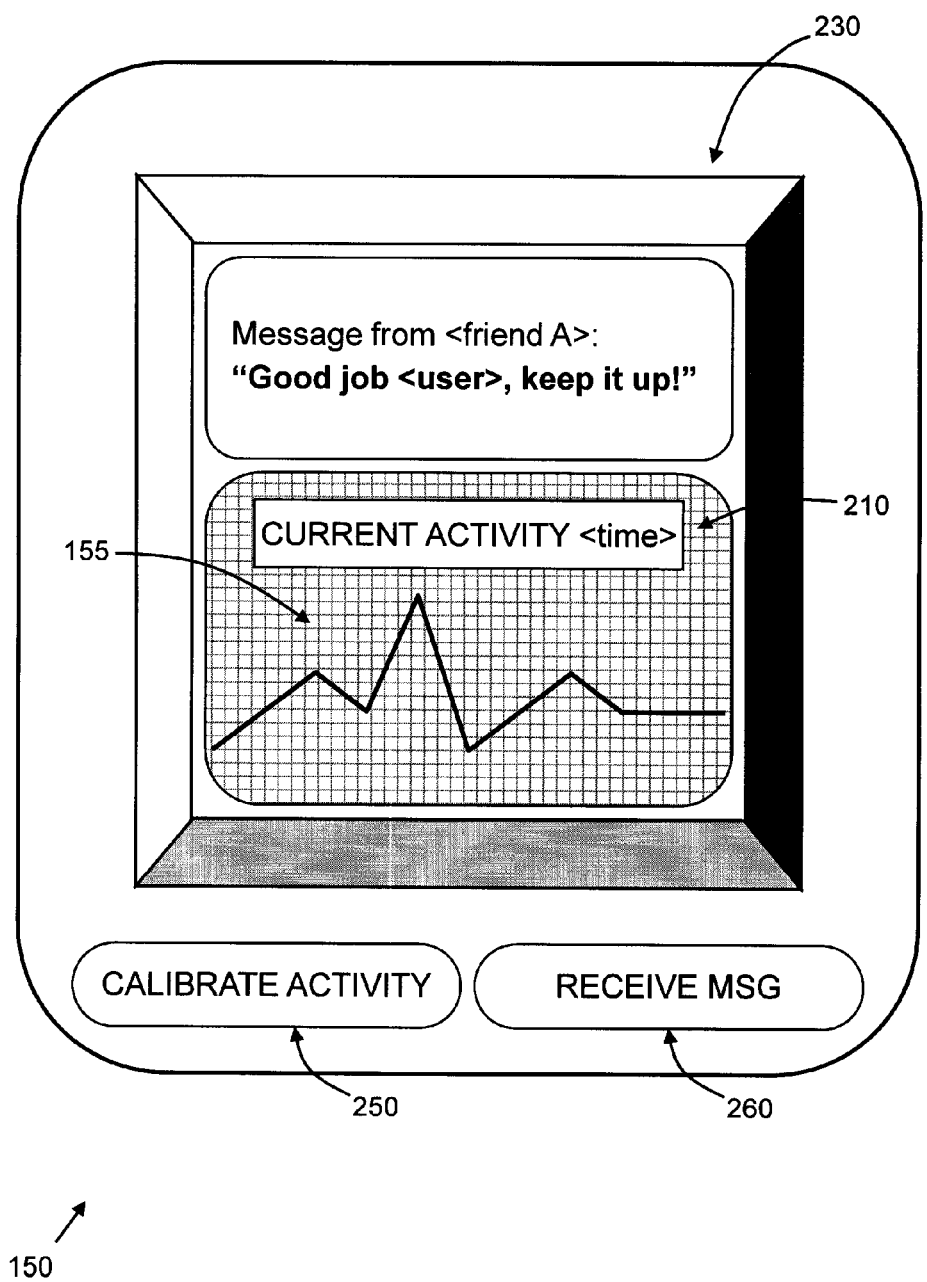
FIG. 2 shows an example of an activity monitor according to the present invention.

FIG. 2 shows an example of an activity monitor 150 measuring an activity signal 155. Optionally, the activity monitor 150 marks a timestamp 210 to denote when the activity signal 155 was measured. The timestamp 210 can be helpful for calibration. Alternatively, the user can manually enter the timestamp on the activity monitor 150 or the application server 120 marks the timestamp when it receives the activity signal 155 from the activity monitor 150.

In a preferred embodiment, a user can communicate with the user's friends through the activity monitor 150. FIG. 2 shows a display 230 on the monitor 150, in which an encouraging message sent by a friend of the user is displayed. A message-receiving button 260 is available to connect with the application server 120 and receive messages from friends of the user. The activity monitor may also have two-way communication capabilities.

Figure 3:
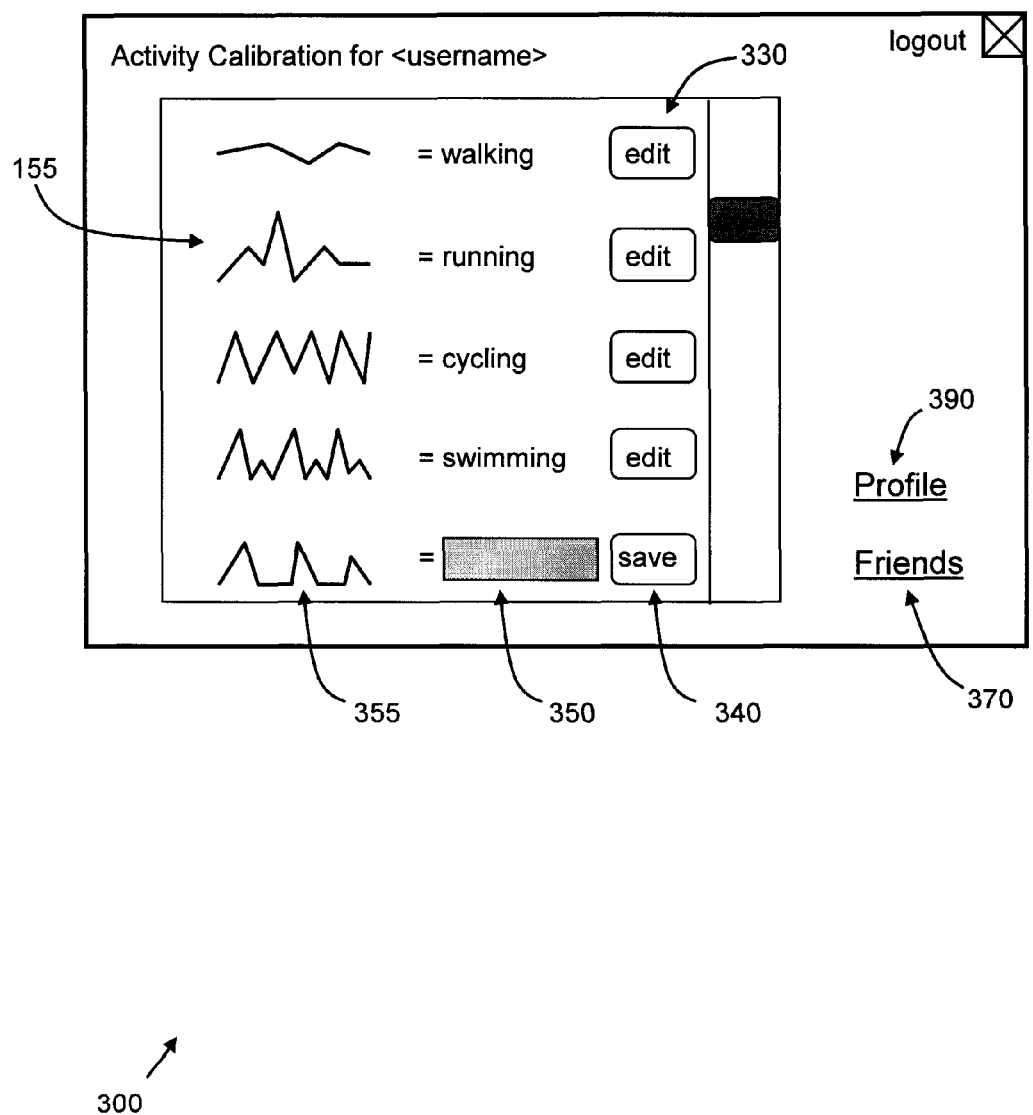
FIG. 3 shows an example of an activity calibration interface according to the present invention.

In a preferred embodiment, the activity signal 155 is transmitted to the application server 120 and stored for later calibration. FIG. 3 shows an example of a user interface 300 accessible by the user to calibrate activity signals. An unidentified activity signal 355 requires calibration. The user enters an identifier for the unidentified activity signal 355 in the textbox 350. The now identified activity signal is saved 340 for later comparison with other activity signals.

Previously calibrated activities can also be edited 330 by changing the identifiers. Alternatively, calibration of the activity can also be accomplished directly on the activity monitor 150 during or after the activity.

The calibrated activity signals are used to identify other activity signals. For example, since the running activity signal 155 is calibrated, the activity monitor 150 would measure a similar but new signal during another run by the user. This new signal would be compared with all of the stored activity signals and identified as a running signal if similarities between the new signal and the calibrated running signal are sufficient. The comparison of signals depends on the nature of the signals and could include thresholds or ranges of values. Preferably, the application server 120 (or a database connected to the server 120) stores the user-calibrated signals and matches new activity signals with the calibrated signals. However, signal comparison and matching can also be accomplished by the activity monitor 150.

Figure 4:
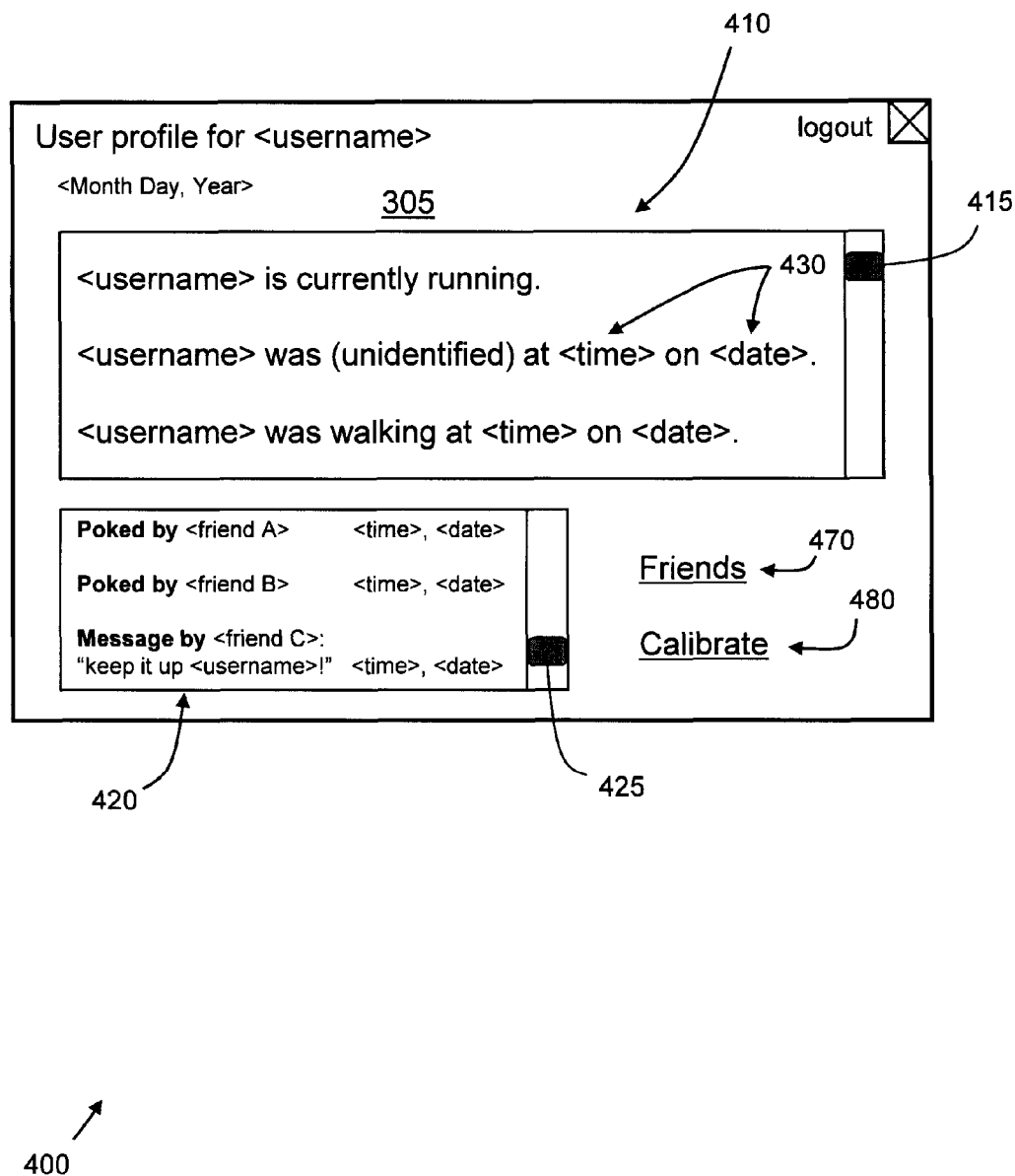
FIG. 4 shows an example of a user profile with a newsfeed displaying user activity according to the present invention.

The application server 120 publishes the activity after the activity signal is compared with the calibrated activity signals and matching has been attempted. In a preferred embodiment, the activity is published on the user profile 400 of the user who is undertaking or has undertaken the activity. An example of a user profile is shown on FIG. 4. The user profile 400 has a newsfeed 410, which displays current and past activities of the user with the activity identifiers. If an activity signal cannot be identified with the calibrated activity signals, the activity corresponding to the activity signal is denoted as unidentified on the newsfeed 410. The time and date 430 of the activities are also published. If an activity were unidentified, the time and date 430 would aid in calibrating the activity. A scroll bar 415 enables viewers of the user profile 400 to scroll to other published activities.

The use of calibrated activities to identify other activities enables automated updates of user behavior to the social network. Automated activity identification and posting eliminates the necessity for a user to tediously and frequently log data. Furthermore, because users self-calibrate their activities, the problems for activity identification due to the large variety of potential activities and the wide variation of activity signals for similar activities among different users are overcome.

It is important to note that the accurately published user activities enable users of the social network to connect to other users around the activities. For example, a user undertaking an activity can use the calibrated and published activities of other users to find other users currently doing the same or a similar activity. The connections are particularly useful for a social network for personal behavioral modification.

For making connections, a function is provided for users of the social network to communicate with each other. A message box 420 is displayed on the user profile 400. The message box shows messages sent to the user by friends of the user. A scroll bar 425 enables viewers of the message box to scroll to other messages sent to the user. The messages sent to the user help to motivate the user and hold the user accountable by knowing that others are monitoring the user's activities. Other user attributes can also be displayed on the user profile 400.

Figure 5:
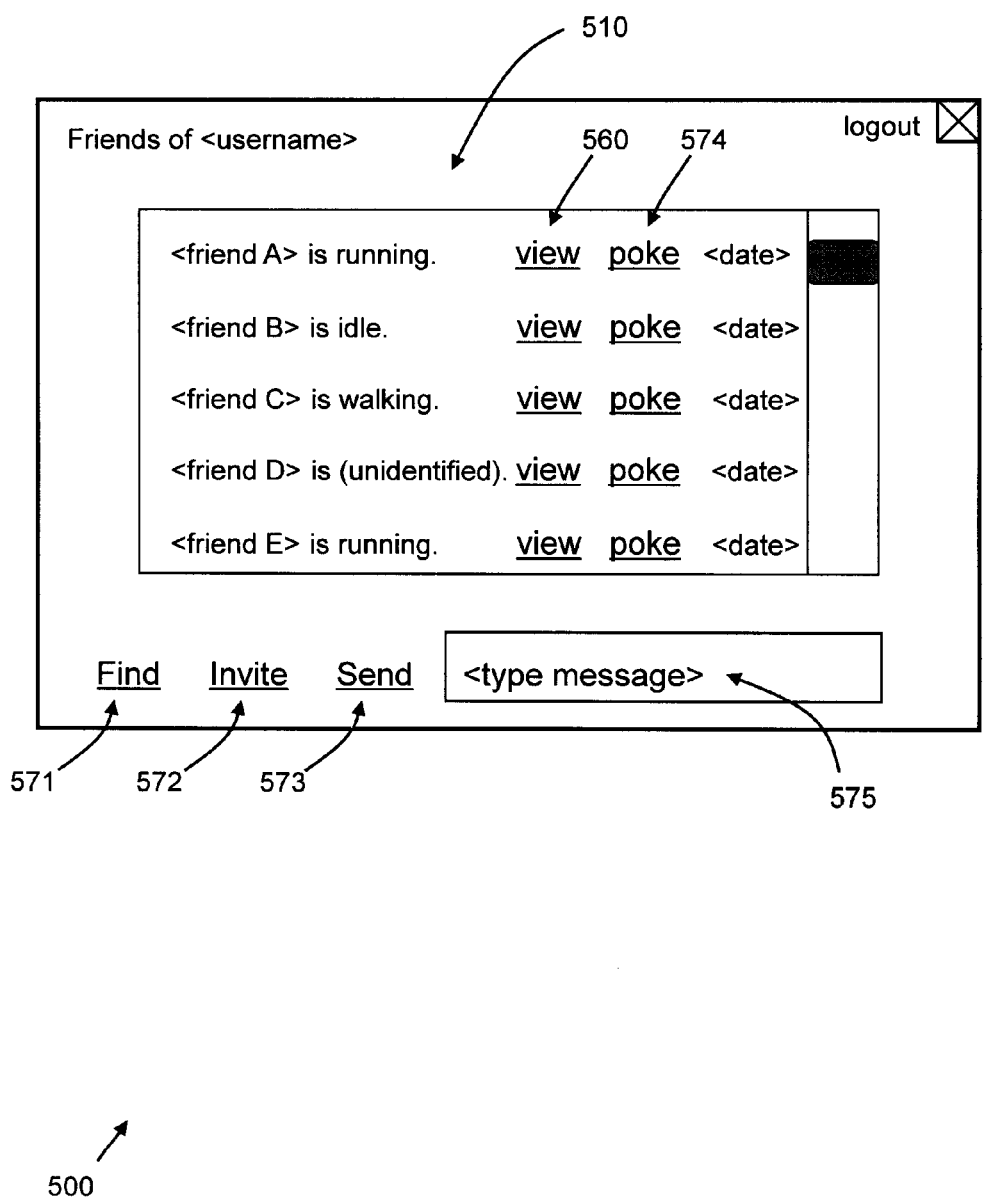
FIG. 5 shows an example of a friends list displaying the activity of the friends of a user according to the present invention.

FIG. 5 shows an example of a friend interface 500 with a list of friends 510. One or more friends of the user may use an activity monitor as well. The current activities of the friends of the user are displayed by the list 510. The activities are published on the list 510 with the corresponding activity identifiers if the activities are calibrated. In one embodiment, a view button 560 links to the user profile of the friend for more detailed displays of the friend's activities and other attributes.

A user and the user's friends can communicate by entering 575 and sending 573 messages. The messages can serve any purpose, including encouragement. In addition to a custom message, the sender of the message can also choose from a list of stored messages. Furthermore, a poke 574 can be sent to a friend. A poke 574 is a short message simply to notify the receiver of the poke 574 that a friend was thinking of the receiver. Optionally, a poke 574 is automatically sent to a user when a friend of the user views the user profile of the user.

A user may also find 571 people to become friends with the user. Potential friends can be contacted by manually entering contact information or by importing email address books and sending emails to people listed in the address books. As mentioned above, friends of a user need not be registered with the social network. Not registered friends of the social network can be invited 572 to join the network. As a registered user of the social network, the application server would host a user profile and maintain a list of friends for the registered member. Further details on the nature of the friends of a registered user are described in U.S. Non-Provisional patent application Ser. No. 11/983,126 filed Nov. 6, 2007, which is hereby incorporated by reference.

As one of ordinary skill in the art will appreciate, various changes, substitutions, and alterations could be made or otherwise implemented without departing from the principles of the present invention, e.g. the Internet could be substituted by a local area network. Accordingly, the scope of the invention should be determined by the following claims and their legal equivalents.

The invention claimed is:

1. A method for publishing user physical activity in a social network, the method comprising:
   (A) measuring a plurality of motions due to physical activities of one of a plurality of users of said social network with a monitor;
   (B) comparing said motions as measured with one or more activity signals previously assigned to respective identifiers by said monitored user;
   (C) assigning said identifiers to said motions where said motions are similar to said activity signals;
   (D) publishing one or more of said motions with said assigned identifiers to a plurality of friends of said monitored user, wherein said friends are some of said users of said social network; and
   (E) publishing one or more of said motions with a default identifier to said friends where said motions are not similar to any of said activity signals.

2. The method as set forth in claim 1, further comprising the step of:
   communicating with each other among said users and said friends.

3. The method as set forth in claim 2, wherein (i) said monitor is a component of a portable wireless device, and (ii) said communications sent from said friends of said monitored user is received by said portable wireless device.

4. The method as set forth in claim 1, wherein said friends of each of said users comprise at least one of (a) one or more of said users registered to said social network and (b) one or more persons not registered to said social network.

5. The method as set forth in claim 1, further comprising the step of:
   maintaining a user profile of each of said users, wherein said motions are published on a newsfeed on said user profile of said monitored user.

6. The method as set forth in claim 1, further comprising the step of:
   storing said motions of said monitored user and respective timestamps of said motions.

7. The method as set forth in claim 1, wherein said monitor is a component of a device selected from at least one of a pedometer, a navigational device, a mobile phone, a personal digital assistant, a handheld device, a wearable device, a medical device, a heart monitor, a glucose monitor, and a diabetes monitor.

8. The method as set forth in claim 1, further comprising the step of:
   sending said motion of said monitored user to an application server via a wireless gateway.

9. A system comprising:
   an application server configured to implement a social network that has a plurality of users, wherein one of said users is monitored; and
   a monitor implemented with hardware and configured to (i) measure a plurality of motions due to physical activities of said monitored user, (ii) compare said motions as measured with one or more activity signals previously assigned to respective identifiers by said monitored user, and (iii) assign said identifiers to said motions where said motions are similar to said activity signals, wherein (a) said application server is configured to publish one or more of said motions with said assigned identifiers to a plurality of friends of said monitored user, and publish one or more of said motions with a default identifier to said friends where said motions are not similar to any of said activity signals, and (b) said friends are some of said users of said social network.

10. The system as set forth in claim 9, wherein (i) said application server hosts a user profile of each of said users of said social network and (ii) said publication is on a newsfeed on said user profile of said monitored user.

11. The system as set forth in claim 9, wherein said friends of each of said users comprise at least one of (a) one or more of said users registered to said social network and (b) one or more persons not registered to said social network.

12. The system as set forth in claim 9, further comprising a wireless gateway, wherein said monitor is a component of a portable wireless device that sends said motion of said monitored user to said application server via said wireless gateway.

13. The system as set forth in claim 12, wherein said friends of said monitored user can send one or more messages to said portable wireless device via said wireless gateway.

14. The system as set forth in claim 9, wherein said monitor comprises an identification module configured to assign said identifiers to said motions.

15. The system as set forth in claim 9, wherein said monitor is a component of a device selected from at least one of a pedometer, a navigational device, a mobile phone, a personal digital assistant, a handheld device, a wearable device, a medical device, a heart monitor, a glucose monitor, and a diabetes monitor.

16. The system as set forth in claim 9, wherein said monitor is a component of a medical device.

17. An apparatus comprising:
- means for measuring a plurality of motions due to physical activities of one of a plurality of users of a social network;
- means for comparing said motions as measured with one or more activity signals previously assigned to respective identifiers by said monitored user;
- means for assigning said identifiers to said motions where said motions are similar to said activity signals; and
- means for publishing (i) one or more of said motions with said assigned identifiers to a plurality of friends of said monitored user, wherein said friends are some of said users of said social network, and (ii) one or more of said motions with a default identifier to said friends where said motions are not similar to any of said activity signals.

* * * * *